United States Patent [19]  [11] 4,256,800

Stockhausen et al.  [45] Mar. 17, 1981

[54] ANTISTATIC AGENTS FOR COATING THE BACKING OF CARPETS AND OTHER FLAT TEXTILE ARTICLES

[75] Inventors: Dolf Stockhausen, Krefeld; Reinmar Peppmöller, Krefeld-Traar, both of Fed. Rep. of Germany

[73] Assignee: Chemische Fabrik Stockhausen & Cie, Krefeld, Fed. Rep. of Germany

[21] Appl. No.: 870,399

[22] Filed: Jan. 18, 1978

Related U.S. Application Data

[63] Continuation of Ser. No. 694,415, Jun. 9, 1976, abandoned.

[30] Foreign Application Priority Data

Jul. 4, 1975 [DE] Fed. Rep. of Germany ....... 2529939

[51] Int. Cl.² ............ A47G 27/02; C09K 3/16; C07C 101/26; C08F 20/06
[52] U.S. Cl. ............ 428/245; 544/401; 544/402; 252/8.8; 252/8.75; 427/393.1; 546/242; 546/244; 546/246; 546/248; 428/96; 428/289; 525/186; 525/375; 525/379; 525/380; 525/381; 525/382; 260/326.5 R; 260/326.5 L; 260/326.85; 260/465.4; 260/501.1; 260/501.2; 260/501.17; 260/501.19; 260/501.21; 544/162; 544/164; 544/170; 544/174; 544/177; 544/382; 544/384; 544/398
[58] Field of Search ................ 428/95, 96, 265, 289, 428/290, 922, 245; 427/294, 390 B; 252/8.8 A, 8.8 B, 8.75; 260/326.5 R, 326.5 L, 326.85, 501.1

[56] References Cited
U.S. PATENT DOCUMENTS

| | | | |
|---|---|---|---|
| 3,000,758 | 9/1961 | Hennemann et al. | 427/390 B |
| 3,200,106 | 8/1965 | Dickson | 252/8.8 B |
| 3,455,735 | 7/1969 | Schwarz | 427/390 B |
| 3,827,931 | 8/1974 | Rothwell et al. | 428/96 |
| 3,908,048 | 9/1975 | Kawanaka et al. | 252/8.8 R |

*Primary Examiner*—James J. Bell
*Attorney, Agent, or Firm*—Sprung, Felfe, Horn, Lynch & Kramer

[57] ABSTRACT

The antistatic composition for application to flat fibrous articles such as textiles, carpets, fabrics and the like which comprises a salt of a polymeric acid with an amine of the general formula

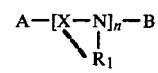

wherein
A=H, —OR₂,

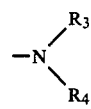

$R_1$=H, a lower alkyl radical, a hydroxyalkyl, aminoalkyl, polyalkylene imine or polyalkylene glycol ether radical;
$R_2$=H, a lower alkyl radical, a hydroxyalkyl, aminoalkyl, polyalkylene imine or polyalkylene glycol ether radical;
$R_3$=H, a lower alkyl radical, a hydroxyalkyl, aminoalkyl, polyalkylene imine or polyalkylene glycol ether radical;
$R_4$=H, a lower alkyl radical, a hydroxyalkyl, aminoalkyl, polyalkylene imine or polyalkylene glycol ether radical;
X=a bivalent alkylene radical having 1 to 6 carbon atoms;
B=H, a lower alkyl radical, a hydroxyalkyl, aminoalkyl, polyalkylene glycol ether or polyalkylene imine radical;
n=small integers from 1 to 6, wherein when n=1 the grouping

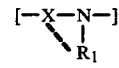

may stand for a bivalent 5- or 6-membered heterocyclic radical having one or more hetero atoms; a process for rendering a normally flat fibrous substance antistatic which comprises applying thereto such an antistatic composition including fibrous articles containing as a component of a coating thereof the novel antistatic agent.

48 Claims, No Drawings

ANTISTATIC AGENTS FOR COATING THE BACKING OF CARPETS AND OTHER FLAT TEXTILE ARTICLES

This is a continuation of application Ser. No. 694,415 filed June 9, 1976 now abandoned.

BACKGROUND OF THE INVENTION

Field of the Invention

This invention relates to antistatic compositions, especially antistatic compositions employed as coating agents for flat fibrous articles such as carpets, furniture fabrics and furnishing fabrics to improve their fitness for use. More especially this invention relates to a process for rendering such flat fibrous articles free of a tendency to build up static electricity. This invention is particularly directed to novel amine salts of polymeric acids employed in the antistatic composition of the invention.

DISCUSSION OF THE PRIOR ART

It is known that flat textile articles, especially those made of synthetic fiber material have a tendency to become electrostatically charged when the air has a low humidity, as a result of which their suitability is adversely affected to a considerable extent. The electrostatic charging of carpets in particular leads to severe disturbances in the operation of precision electronic apparatuses (for example data processing systems) as well as to the unpleasant phenomenon of electrostatic discharge in living beings.

There has been no lack of experiments to develop fibrous materials which were alleged to have antistatic properties either because of the chemical structure of the fiber composition or through the use of certain additives. Metallic fibers have been frequently incorporated into the fiber yarn during spinning, which serves the same purpose. It can be ascertained that even in the case of a favorable surface structure, produced by the finishing process, of the flat textile articles, the antistatic effect is not normally sufficient in itself, even though owing to the continuous longitudinal alignment of the antistatic yarn looped carpet fabric, for example, has a more favorable behavior as regards electrostatic properties than velour materials in which the continuity of the yarn is interrupted by cutting and clipping of the pile at each loop. It is therefore always necessary, particularly with cut and clipped pile fabric of antistatic fibers, to render conductive the coating on the backing as well.

According to German Pat. No. 1,217,916 and German Pat. No. 1,286,669, it is known to use carbon black as an antistatic agent, particularly in natural and synthetic latices for textile coatings. However, it can only be used within narrow limits, owing to the fact that it imparts its color. Over and above this, there is a large number of other known antistatic agents such as quaternary nitrogen compounds, phosphoric acid ester salts, polyethylene glycol alkyl esters or ethers and oxalkylated amines, the use of which in latices for textile coatings has already been attempted. However, both the carbon black as well as the other additives mentioned have in common the considerable disadvantage that in the presence of water and/or organic solvents, they migrate into the textile item and form spots in it. As a result, the appearance of the item is considerably impaired and it thus becomes useless.

Accordingly, it has become desirable to provide antistatic agents for generally flat fibrous articles such as textiles, carpet backing, furniture fabrics and the like which are free of any tendency to discolor the article. It has become especially desirable to provide an antistatic agent which can readily be incorporated into carpet backing latexes. It has, moreover, become desirable to provide a new antistatic agent which will be effective under conditions of use in decreasing the surface resistance of carpet backing and the like during use.

SUMMARY OF THE INVENTION

The foregoing long felt desideratum are answered, in accordance with the invention, by an antistatic composition comprising an amine salt of a polymeric acid, the amine portion having the formula

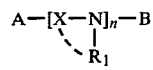

wherein
A=H, —OR$_2$,

R$_1$=H, a lower alkyl radical, a hydroxyalkyl, aminoalkyl, polyalkylene imine or polyalkylene glycol ether radical;

R$_2$=H, a lower alkyl radical, a hydroxyalkyl, aminoalkyl, polyalkylene imine or polyalkylene glycol ether radical;

R$_3$=H, a lower alkyl radical, a hydroxyalkyl, aminoalkyl, polyalkylene imine or polyalkylene glycol ether radical;

R$_4$=H, a lower alkyl radical, a hydroxyalkyl, aminoalkyl, polyalkylene imine or polyalkylene glycol ether radical;

X=a bivalent alkylene radical having 1 to 6 carbon atoms;

B=H, a lower alkyl radical, a hydroxyalkyl, aminoalkyl, polyalkylene glycol ether or polyalkylene imine radical;

n=small integers from 1 to 6, wherein when n=1 the grouping

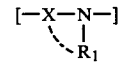

may stand for a bivalent 5- or 6-membered heterocyclic radical having one or more hetero atoms.

It has now been demonstrated in accordance with the invention that the drawbacks of conventional antistatic agents are provided by salts of polymeric acids, especially salts of polymeric acids with mono- and polyamines or with the reaction product of these amines with alkylene oxides and alkylene imines.

In accordance with this invention salts of polymeric acids are formed. The polymeric acid itself can be any of a wide variety of acids including, in particular, polyacrylic acid, polymethacrylic acid, polyitaconic acid, polyvinylsulfonic acid. Copolymers of polymeric acids with one another are also contemplated. Furthermore, copolymers of a polymeric acid with another polymerizable monomer free of an acid function are also included. Of the latter group there are particularly contemplated copolymerizable monomers such as acrylonitrile, acrylamide, Generally speaking, the polymeric acids employed in accordance with this invention (in the form an amine salt) have a molecular weight between $5 \times 10^3$ and $1.5 \times 10^6$, preferably between $5 \times 10^4$ and $1 \times 10^6$ determined by. The molecular weight range given for the polymeric acids, likewise, applies to copolymers of at least two polymeric acids or copolymers of at least one polymeric acid with another polymerizable monomer. It is preferred that the polymeric acids or copolymers thereof have a molecular weight of at least 5,000.

Where a copolymer is employed derived from monomers having an acid function and monomers free of an acid function, it is preferred that the monomers having an acid function account for between 5 and 99%, preferably between 15 and 80% of the polymeric moiety. Generally speaking, the monomers having an acid function will account for between 12 and 75% by weight of such a copolymer.

Also contemplated for use in the form of an amine salt thereof are mixed polymers of monomers which can be polymerized only in conjunction with other monomers. Particularly contemplated is maleic acid with styrene. These mixed polymers are those whose polymerizability is generally only possible in conjunction with such monomers.

The polymeric components of the antistatic agent of the invention are employed in the form of amine salts. Specific amines are contemplated which neutralize the polymeric acids. These amines have the formula:

$$A-[X-N]_n-B$$
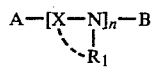

wherein
A=H, —OR$_2$,

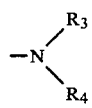

R$_1$=H, a lower alkyl radical, a hydroxyalkyl, aminoalkyl, polyalkylene imine or polyalkylene glycol ether radical;
R$_2$=H, a lower alkyl radical, a hydroxyalkyl, aminoalkyl, polyalkylene imine or polyalkylene glycol ether radical;
R$_3$=H, a lower alkyl radical, a hydroxyalkyl, aminoalkyl, polyalkylene imine or polyalkylene glycol ether radical;
R$_4$=H, a lower alkyl radical, a hydroxyalkyl, aminoalkyl, polyalkylene imine or polyalkylene glycol ether radical;
X=a bivalent alkylene radical having 1 to 6 carbon atoms;
B=H, a lower alkyl radical, a hydroxyalkyl, aminoalkyl, polyalkylene glycol ether or polyalkylene imine radical;
n=small integers from 1 to 6, wherein when n=1 the grouping

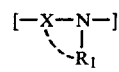

may stand for a bivalent 5- or 6-membered heterocyclic radical having one or more hetero atoms. The hetero atoms can be nitrogen and oxygen.

Accordingly, primary, secondary or tertiary amines as well as their oxalkylation products and reaction products with alkylene imine are suitable. Not only are open-chain amines suitable but also cyclic amines, including both iso- and heterocyclic amines.

When the radicals R$_1$, R$_2$, R$_3$, R$_4$ and B stand for a lower alkyl radical, a hydroxyalkyl radical or an aminoalkyl radical, then these radicals may be identical or different. In this case the alkyl radicals and alkyl proportions in hydroxyalkyl and aminoalkyl radicals preferably do not have more than 4 carbon atoms. The straight-chain radicals are preferred from among these lower alkyl radicals.

When the radicals R$_1$, R$_2$, R$_3$ and R$_4$ stand for a polyalkylene imine radical or a polyalkylene glycol ether radical, then the size of these radicals, expressed by the molecular weight determined by usual viscosimetric methods (imines) or the number of moles alkylene oxide (polyalkylene glycol ethers) is ordinarily not more than 1,500, preferably not more than about 1,200.

For the bivalent alkylene radical X, those alkylene radicals are preferred which are derived from the alkylene oxides which are readily available in industry, such as ethylene oxide (2 carbon atoms), propylene oxide (3 carbon atoms), and butylene oxide (4 carbon atoms).

For the polyalkylene imine and polyalkylene glycol ether radicals too, preference is given to alkylene radicals having 1 to 6, especially 2 to 4 carbon atoms, which can be derived from readily available oxides.

When the grouping

where n=1, stands for a heterocyclic radical, then an alicyclic radical having at least one nitrogen atom is to be understood. Nitrogen and/or oxygen may appear as further hetero atoms in the ring system.

Broadly speaking, of the amines grouped under the above formula the amines which are industrially readily available and also cheap, are preferred. Suitable amines, which correspond to the above general formula are, for example, the aliphatic amines, such as ethylene diamine, propylene diamine, butylene diamine, diethylene triamine, triethylene tetramine, tetraethylene pentamine, dipropylene triamine, dimethylaminopropylamine, amines carrying hydroxyl groups, i.e., amino alcohols, such as dimethylaminoethanol, dimethylaminoisopropanol, triethanolamine, also branched-chain amines such as 2-dimethylpropylene diamine.

The different polyimines having molecular weights of up to about 200 and obtained by polymerization of polyalkylene imines are also suitable. Just as suitable as the abovementioned amines are, as already mentioned, their reaction products with alkylene oxide and alkylene imine. Apart from piperidine and piperazine, morpholine in particular is suitable on heterocyclic compounds. Furthermore, N-(2-aminoethyl)-morpholine, N-(2-aminoethyl)-piperazine and N-(2-aminoethyl)-pyrrolidine may be used. Here too, their reaction products with alkylene oxide and alkylene imine may likewise be used.

METHOD OF PREPARATION

The preparation of the amine salts of the polymeric acid can be carried out in a simple manner by reacting an aqueous solution or dispersion of the polymeric acid with an equivalent of amine. Generally speaking, the reaction is carried out at a temperature between 20° and 80° C., preferably between 20° and 40° C. While both sub and superatmospheric pressures can be employed the reaction is generally conducted at atmospheric pressure. Generally speaking, there is a stoichiometric excess of amine relative to the acid function. The stoichiometric excess of the milliequivalents of amine per milliequivalent of acid moiety on the polymeric acid is in the range of 1.3 to 1.05:1. The reaction is carried out until the acid is substantially neutralized as determined by pH measurements. Generally speaking, the reactor is conducted until the pH of the resultant solution or dispersion is in the range of 6 to 8, preferably 6.5 to 7.5. To facilitate the neutralization of the acid an aqueous ammonia or the like solution can be employed.

It is to be understood that the amine salts of the polymeric acids include amine salts of polymeric acids having a plurality of polymeric acids. These polymeric acids themselves can have different molecular weights. Also contemplated are mixtures of acids which have been neutralized by different amines. The antistatic agent of the present invention therefore comprises both a single neutralized polymeric acid, a mixture of neutralized polymeric acids or neutralized co-polymers of a polymeric acid and another polymerizable monomer. Also contemplated are polymeric acids which are neutralized by a mixture of amine.

Corresponding to the radicals used in the general formula, the claimed salts of the polymeric acids are soluble even in non-aqueous media and may be used from such media.

The aqueous solutions of the polymeric salts are used at a concentration of active substance of from 0.01 to 20%, preferably from 1 to 5% (relative to the weight when wet of the coating composition). The polymeric acids used to form the salts advantageously have a molecular weight of at least 5,000. Preferably, polymers having a molecular weight of between 50,000 and 1,000,000 are used. It can also prove advantageous, in order to achieve an antistatic effect and to prevent simultaneously the formation of spots on the textile item, as stated above, to use mixtures of the polymeric salts.

In order to more fully illustrate the nature of the invention and the manner of practicing the same the following examples are presented. In the examples molecular weights are given. These molecular weights were determined by the usual viscosimetric methods (as described by Staudinger: Koll. Etschr. 53,19 (1930)). All molecular weights recited herein are determined in accordance with such procedure.

EXAMPLE 1

30.2 parts of a 31% aqueous solution of polyacrylic acid having a molecular weight of about 150,000 and an acid number of 4.22 milliequivalents/gram were mixed, while cooling with water, with 67.9 parts of a triethanolamine polyglycol ether (containing 17 moles of ethylene oxide; titratable bases 1.12 milliquivalents/gram). The pH value of the neutralized solution is 6.9. By adding 1.9 parts of an approximately 23% aqueous ammonia solution the pH value was increased to 7.1.

The resulting product was honey yellow and clear. It had a viscosity of about 5,000 cP (Brookfield RV Sp. 2/5). The solids content was about 78%.

This antistatic agent was worked into a typical primer compound for a carpet backing in the following manner:

360 parts of a synthetic polymer latex having 50% solid portions based on 60 parts of butadiene and 40 parts of styrene were taken first. 540 parts of chalk powder ("Jura white BLR 3" manufactured by Messrs. Merkle and having about 20 milliequivalents of bonded titratable alkali) were then stirred in. After homogenisation, 33 parts of the antistatic agent which had previously been diluted with 67 parts of water, were added to the composition and a stirred well with it.

Using a lambskin roller, 1000 g/m$^2$ (weight when wet) of the compound prepared in this manner were uniformly applied to DIN A4 size pieces of tufting velour pile carpet made of antistatic fiber of various manufacturers (weight of pile: about 500 g/m$^2$; base fabric made of polypropylene). The coated pieces of carpet were dried for 30 minutes at 80° C. in a hot air drying cupboard, and, after cooling, conditioned in an atmosphere of 30% relative humidity and 20° C. for 24 hours. Immediately following the conditioning, the surface resistances of the pile and the coated backing of the specimens as well as their current-flow resistance (pile side up) were measured according to DIN 54345. The results of the measurement can be seen from the attached Table.

EXAMPLE 2

51.2 parts of the 33% aqueous solution of a copolymer consisting of 90 parts of acrylic acid and 10 parts of itaconic acid having a molecular weight of about 150,000 and an acid number of 4.43 milliequivalents/gram were taken first. The neutralization to a pH value of 7.5 was effected analogously to Example 1 with 43.6 parts of a triethylene tetramine polyglycol ether (10 moles of ethylene oxide; titratable bases 5.2 milliequivalents/gram) and with 5.1 parts of a 23% aqueous ammonia solution. The product obtained having a solids content of 62% was a dark red-brown color and clear. The viscosity was about 10,500 cP (Brookfield RV Sp. 3/5).

The compound was composed of the following constituents:
360 parts of latex as in Example 1,
540 parts of chalk as in Example 1,
42 parts of antistatic agent,
58 parts of water.

The application and test were carried out as in Example 1. The results of the measurement are given in the attached Table.

EXAMPLE 3

70.6 parts of a 37% aqueous solution of a copolymer of 90 parts of acrylic acid and 10 parts of maleic acid having a molecular weight of about 50,000 and an acid number of 4.5 milliequivalents/gram, were neutralized with 29.4 parts of morpholine, while cooling with water, to a pH value of 7.8.

This product obtained was yellowish and clear and had a solids content of about 56%. The viscosity was about 1,500 cP (Brookfield RV Sp. 2/5).

The compound composition for the test was:

370 parts of latex as in Example 1,
540 parts of chalk as in Example 1,
46 parts of antistatic agent,
54 parts of water, The application and test were effected as described in Example 1. The results of the measurement are listed in the attached Table.

EXAMPLE 4

69.6 parts of a 39% aqueous solution of a polymethacrylic acid having a molecular weight of about 100,000 and an acid number of 4.17 milliequivalents/gram were adjusted to a pH value of 7.7 with 30.4 parts of dimethylisopropanolamine. The product obtained had a solids content of about 58%, and was a red-brown, clear liquid having a viscosity of about 1,800 cP (Brookfield RV Sp. 2/5).

The compound was composed of the following products:
360 parts of latex as in Example 1,
540 parts of chalk as in Example 1,
44 parts of antistatic agent,
56 parts of water.

Application and test were effected as described in Example 1. The results of the measurement according to DIN 54345 are given in the attached Table.

EXAMPLE 5

52.6 parts of the 31% aqueous solution of a polyacrylic acid having a molecular weight of about 150,000 and an acid number of 4.22 milliequivalents/gram were neutralized, as described in Example 1 to a pH value of 7.5 with 46.3 parts of a triethylene tetramine/propylene oxide adduct having 6 moles of propylene oxide (titratable bases 4.8 milliequivalents/gram) and 1.1 parts of a 23% aqueous solution of ammonia. The resulting clear, water-soluble product having a solids content of about 63% was brown and highly viscous. The test compound had the following composition:
360 parts of latex as in Example 1,
540 parts of chalk as in Example 1,
40 parts of antistatic agent,
60 parts of water.

Application and test were effected as in Example 1; results of the measurement are given in the Table.

EXAMPLE 6

22.3 parts of a copolymer of 83 parts of styrene and 17 parts of maleic acid were stirred into 70 parts of water and while cooling, were adjusted to a pH value of 8.6 with 7.7 parts of diethanolamine. The product obtained was yellowish and had a solids content of about 30%. The viscosity was about 22,000 cP (Brookfield RV Sp. 4/5).

The test compound had the following composition:
360 parts of latex as in Example 1,
540 parts of chalk as in Example 1,
87 parts of antistatic agent,
13 parts of water.

Application and test were effected according to Example 1.

EXAMPLE 7

42.6 parts of a 34% aqueous solution of polyacrylic acid having a molecular weight of about 70,000 and an acid number of about 4.73 milliequivalents/gram were mixed with 28.7 parts of a triethylene tetramine polyglycol ether (containing 10 moles of ethylene oxide, titratable bases 5.2 milliequivalents/gram) and 28.7 parts of a triethanolamine polyglycol ether (containing 7 moles of ethylene oxide, titratable bases 2.0 milliequivalents/gram). The pH value of the neutralized solution was 6.9 and was increased to 7.6 with 1.0 part of 23% ammonia solution.

The product obtained was brownish yellow and had a viscosity of 24,000 cP (Brookfield RV 4/5). The solids content was about 72%.

The compound was composed of the following products:
360 parts of latex as in Example 1,
540 parts of chalk as in Example 1,
34 parts of antistatic agent,
66 parts of water.

Application and test were effected as in Example 1. The results of the measurement are summarized in the attached Table.

EXAMPLE 8

21.3 parts of a 34% aqueous solution of polyacrylic acid, having a molecular weight of about 70,000 and an acid number of 4.73 milliequivalents/gram, and 25.6 parts of a 33% aqueous solution of a copolymer consisting of 90 parts of acrylic acid and 10 parts of itaconic acid having a molecular weight of about 150,000 and an acid number of 4.43 milliequivalents/gram, were mixed with 36.1 parts of a triethylene tetramine polyglycol ether (10 moles of ethylene oxide, titratable bases 5.2 milliequivalents/gram) and with 14.3 parts of a triethanolamine polyglycol ether (containing 7 moles of ethylene oxide, titratable bases 2.0 milliequivalents/gram). The pH value was adjusted to 7.6 with 2.9 parts of a 23% aqueous solution of ammonia.

The product obtained was brownish-yellow and had a viscosity of about 17,000 cP (Brookfield RV 4/5) at a solids content of 67%.

The compound was composed of:
360 parts of latex as in Example 1,
540 parts of chalk as in Example 1,
39 parts of antistatic agent,
61 parts of water.

Application and test were effected in accordance with Example 1. The results of the measurement can be seen from the attached Table.

EXAMPLE 9

70.6 parts of a 37% aqueous solution of a copolymer of 90 parts of acrylic acid and 10 parts of maleic acid having a molecular weight of about 50,000 and an acid number of 4.5 milliequivalents/gram were neutralized to a pH value of 7.8 with 29.4 parts of piperidine while cooling with water.

The product obtained was yellowish and clear and had a solids content of about 56%. The viscosity was about 1,400 cP (Brookfield RV Sp. 2/5).

The compound composition for the test was:
360 parts of latex as in Example 1,
540 parts of chalk as in Example 1,
46 parts of antistatic agent,
54 parts of water.

Application and test were effected as in Example 1. The results of the measurement can be seen from the attached Table.

EXAMPLE 10

71.0 parts of a 30% aqueous solution of polyacrylic acid having a molecular weight of about 150,000 and an acid number of 4.20 milliequivalents/gram, were neutralized with 28.0 grams of piperazine (containing 6 moles of water of crystallization) and 1.0 part of aqueous concentrated ammonia. The pH value was 7.6.

The product obtained was light yellow and had a viscosity of 280 cP (Brookfield RV 2/10). The solids content was about 34.0%.

The compound was composed of the following constituents:
360 parts of latex as in Example 1,
540 parts of chalk as in Example 1,
76 parts of antistatic agent,
24 parts of water.

Application and test were effected as in Example 1. The results can be seen from the Table.

TABLE

Results of the measurement for Examples 1 to 10
(DIM 53345 (Sic) after 24 hours at 30% relative humidity/20° C.)

| Compound | | Surface Resistance Pile | Backing | Current-flow resistance |
|---|---|---|---|---|
| 350 (Sic) latex | } without antistatic agent | $2 \times 10^{12}$ | $3 \times 10^{12}$ | $2.4 \times 10^{13}$ |
| 540 chalk | | | | |
| from Example 1 | | $2 \times 10^{12}$ | $4 \times 10^{8}$ | $1 \times 10^{13}$ |
| from Example 2 | | $2 \times 10^{12}$ | $6 \times 10^{9}$ | $2.1 \times 10^{12}$ |
| from Example 3 | | $2 \times 10^{12}$ | $1.5 \times 10^{10}$ | $1.2 \times 10^{13}$ |
| from Example 4 | | $2 \times 10^{12}$ | $4 \times 10^{10}$ | $1.2 \times 10^{13}$ |
| from Example 5 | | $2 \times 10^{12}$ | $8 \times 10^{11}$ | $2.7 \times 10^{13}$ |
| from Example 6 | | $2 \times 10^{12}$ | $6 \times 10^{11}$ | $1 \times 10^{13}$ |
| from Example 7 | | $2 \times 10^{12}$ | $5 \times 10^{9}$ | $2.5 \times 10^{12}$ |
| from Example 8 | | $2 \times 10^{12}$ | $4 \times 10^{9}$ | $2.7 \times 10^{12}$ |
| from Example 9 | | $2 \times 10^{12}$ | $3 \times 10^{10}$ | $29. \times 10^{13}$ |
| from Example 10 | | $2 \times 10^{12}$ | $5 \times 10^{10}$ | $2.6 \times 10^{13}$ |

What is claimed is:

1. An antistatic agent containing water or an organic solvent and an antistatically effective amount of a salt of a polymeric acid with an oxalkylated or aminealkylated amine of the general formula

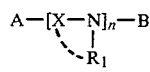

wherein
A=H, —OR₂ or

$R_1$ is a lower alkyl, hydroxyalkyl, aminoalkyl, polyalkyleneimine or polyalkylene glycol ether radical;

$R_2$ is a lower alkyl radical, hydroxyalkyl, aminoalkyl, polyalkyleneimine or polyglycol ether radical;

$R_3$ is a lower alkyl radical, hydroxyalkyl, aminoalkyl, polyalkyleneimine or polyalkylene glycol ether radical;

$R_4$ is a lower alkyl radical, hydroxyalkyl, aminoalkyl, polyalkyleneimine or polyalkylene glycol ether radical;

X is a bivalent alkylene radical having 1 to 6 carbon atoms;

B is a lower alkyl radical, a hydroxyalkyl, aminoalkyl, polyalkylene glycol ether or polyalkylene imine radical;

n=an integer from 1 to 6 wherein when n=1 the group

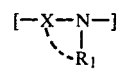

may be a bivalent 5- or 6-membered heterocyclic radical having 1 or more hetero atoms, at least one of the radicals $R_1$, $R_2$, $R_3$, $R_4$, and B being a polyalkylene imine or polyalkylene glycol ether radical.

2. An antistatic agent according to claim 1, characterized in that at least one of the radicals $R_1$, $R_2$, $R_3$, and $R_4$ is a polyalkylene imine or polyalkylene glycol ether radical having a molecular weight of not more than 1,500.

3. An antistatic composition according to claim 2 wherein said polyalkylene imine or polyalkylene glycol ether radical has a molecular weight of not more than 1,200.

4. An antistatic composition according to claim 1 wherein the polymeric acid comprises a polymer of polyacrylic acid, polymethacrylic acid, polyitaconic acid, polyvinyl sulfonic acid or a copolymer thereof.

5. An antistatic agent according to claim 4 wherein the polymeric acid is a copolymer of at least two polymeric acids.

6. An antistatic agent according to claim 4 wherein the polymeric acid is a copolymer of at least one polymeric acid with a monomer free of an acid function.

7. An antistatic agent according to claim 1 wherein said polymeric acid comprises mixed polymers of monomers the polymerizability of which is only possibly in conjunction with other monomers.

8. An antistatic agent according to claim 1 wherein the polymeric or copolymeric acid has a molecular weight of at least 5,000.

9. An antistatic agent according to claim 1 wherein said antistatic agent comprises a copolymer of at least two polymeric acids having different molecular weight.

10. An antistatic agent according to claim 1 wherein said antistatic agent comprises a copolymer of at least two polymeric acids neutralized by different amines.

11. An antistatic agent according to claim 1 wherein said antistatic agent comprises a mixture of different polymeric acids.

12. An antistatic agent according to claim 1 wherein said salt is present in said antistatic agent in an amount of 0.01 to 20% by weight.

13. An antistatic agent according to claim 12 wherein said salt is present in said antistatic agent in an amount of 1 to 5% by weight.

14. A process for rendering a flat fibrous article antistatic which comprises applying thereto the composition of claim 1.

15. A process for rendering a flat fibrous article antistatic which comprises applying thereto the composition of claim 12.

16. A process according to claim 14 wherein said fibrous article is a carpet.

17. A flat fibrous article comprising textile fibers and the composition of claim 1.

18. A carpet having fiber and a carpet backing, said carpet backing containing the composition of claim 1.

19. A salt of a polymeric acid with an oxalkylated or amine-alkylated amine of the general formula

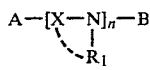

wherein
A=H, —OR$_2$ or

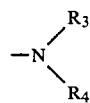

R$_1$ is a lower alkyl, hydroxyalkyl, aminoalkyl, polyalkyleneimine or polyalkylene glycol ether radical;
R$_2$ is a lower alkyl radical, hydroxyalkyl, aminoalkyl, polyalkyleneimine or polyglycol ether radical;
R$_3$ is a lower alkyl radical, hydroxyalkyl, aminoalkyl, polyalkyleneimine or polyalkylene glycol ether radical;
R$_4$ is a lower alkyl radical, hydroxyalkyl, aminoalkyl; polyalkyleneimine or polyalkylene glycol ether radical;
X is a bivalent alkylene radical having 1 to 6 carbon atoms;
B is a lower alkyl radical, a hydroxyalkyl, aminoalkyl, polyalkylene glycol ether or polyalkyleneimine radical;
n=an integer from 1 to 6 wherein when n=1 the group

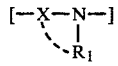

may be a bivalent 5- or 6-membered heterocyclic radical having 1 or more hetero atoms,
at least one of the radicals R$_1$, R$_2$, R$_3$, R$_4$, and B being a polyalkylene imine or polyalkylene glycol ether radical.

20. An antistatic composition for the backing of textile materials comprising a primer compound and the antistatic agent of claim 1.

21. An antistatic composition according to claim 20 wherein said primer compound is a latex.

22. An antistatic composition according to claim 20 wherein the antistatic agent is one which is soluble in said primer compound.

23. An antistatic agent for the coating of flat textile articles, carpets, rugs and the like comprising a substantially neutralized polymeric acid, said acid substantially neutralized with an amine of the general formula

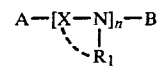

wherein
A=H, —OR$_2$,

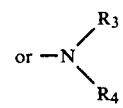

R$_1$=a lower alkyl radical, a hydroxyalkyl, aminoalkyl, polyalkylene imine or polyalkylene glycol ether radical;
R$_2$=a lower alkyl radical, a hydroxyalkyl, aminoalkyl, polyalkylene imine or polyalkylene glycol ether radical;
R$_3$=a lower alkyl radical, a hydroxyalkyl, aminoalkyl, polyalkylene imine or polyalkylene glycol ether radical;
R$_4$=a lower alkyl radical, a hydroxyalkyl, aminoalkyl, polyalkylene imine or polyalkylene glycol ether radical;
X=a bivalent alkylene radical having 1 to 6 carbon atoms;
B=a lower alkyl radical, a hydroxyalkyl, aminoalkyl, polyalkylene glycol ether or polyalkylene imine radical;
n=small integers from 1 to 6, wherein when n=1 the grouping

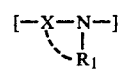

may stand for a bivalent 5- or 6-membered heterocyclic radical having one or more hetero atoms at least one of said R$_1$, R$_2$, R$_3$, R$_4$, or B being a polyalkylene imine or polyalkylene glycol ether radical.

24. An antistatic agent according to claim 23 wherein said triethanolamine is an alkoxylated triethanolamine.

25. An antistatic agent according to claim 24 wherein said triethanolamine is ethoxylated.

26. An antistatic agent according to claim 23 wherein said triethanolamine is ethoxylated.

27. An antistatic agent for the coating of flat textile articles, carpets, rugs and the like comprising a substantially neutralized polymeric acid, said polymeric acid neutralized with an amine of the general formula

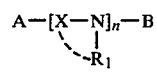

wherein
A=H, —OR$_2$,

$R_1$, $R_2$, $R_3$ and $R_4$ = polyalkylene imine or polyalkylene glycol ether radical;

X = a bivalent alkylene radical having 1 to 6 carbon atoms;

B = polyalkylene glycol ether or polyalkylene imine radical;

n = small integers from 1 to 6, wherein when n = 1 the grouping

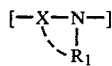

may stand for a bivalent 5- or 6-membered heterocyclic radical having one or more hetero atoms.

28. An antistatic agent according to claim 27 wherein each $R_1$, $R_2$, $R_3$ or $R_4$ is a polyalkylene glycol ether radical.

29. An antistatic agent according to claim 28 wherein each group $R_1$ to $R_4$ has a molecular weight not more than 1,500.

30. An antistatic agent according to claim 28 wherein each group $R_1$ to $R_4$ has a molecular weight not more than 1,200.

31. An antistatic agent according to claim 28 wherein the alkylene radical has 1 to B 6 carbon atoms.

32. An antistatic agent according to claim 31 wherein said alkylene radical has 2 to 4 carbon atoms.

33. An antistatic agent according to claim 32 wherein said alkylene radical is an ethylene radical.

34. An antistatic agent according to claim 32 wherein said alkylene radical is a propylene radical.

35. An antistatic agent for the coating of flat textile articles, carpets, rugs and the like comprising a substantially neutralized polymeric acid, said acid neutralized with an amine of the general formula

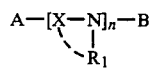

wherein
A = H, —$OR_2$, or

$R_1$ = a lower alkyl radical, a hydroxyalkyl, aminoalkyl, polyalkylene imine or polyalkylene glycol ether radical;

$R_2$ = a lower alkyl radical, a hydroxyalkyl, aminoalkyl, polyalkylene imine or polyalkylene glycol ether radical;

$R_3$ = a lower alkyl radical, a hydroxyalkyl, aminoalkyl, polyalkylene imine or polyalkylene glycol ether radical;

$R_4$ = a lower alkyl radical, a hydroxyalkyl, aminoalkyl, polyalkylene imine or polyalkylene glycol ether radical;

X = a bivalent alkylene radical having 1 to 6 carbon atoms;

B = a lower alkyl radical, a hydroxyalkyl, aminoalkyl, polyalkylene glycol ether or polyalkylene imine radical;

n = small integers from 1 to 6, wherein when n = 1 the grouping

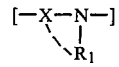

may stand for a bivalent 5- or 6-membered heterocyclic radical having one or more hetero atoms, said polymeric acid being selected from the group consisting of a copolymer of acrylic acid and itaconic acid, a copolymer of acrylic acid and maleic acid, polymethacrylic acid, polyacrylic acid, and a copolymer of styrene and maleic acid, at least one of said $R_1$, $R_2$, $R_3$, $R_4$, and B is a polyalkylene imine or polyalkylene glycol ether radical.

36. An antistatic agent for the coating of flat textile articles, carpets, rugs and the like comprising a substantially neutralized salt of a polymeric acid, said polymeric acid neutralized with triethylene tetramine polyglycol ether.

37. An antistatic agent according to claim 36 wherein said polymeric acid is neutralized with said triethylene tetramine polyglycol ether and ammonia.

38. An aqueous solution of the substantially neutralized polymeric acid of claim 23.

39. An aqueous solution of the substantially neutralized polymeric acid of claim 27.

40. An aqueous solution of the substantially neutralized polymeric acid of claim 35.

41. An aqueous solution of the substantially neutralized polymeric acid of claim 36.

42. An antistatic agent according to claim 23 wherein the polymeric acid has been neutralized to pH 6–8.

43. An antistatic agent according to claim 27 wherein the polymeric acid has been neutralized to pH 6–8.

44. An antistatic agent according to claim 35 wherein the polymeric acid has been neutralized to pH 6–8.

45. An antistatic agent according to claim 36 wherein the polymeric acid has been neutralized to pH 6–8.

46. An aqueous solution of the salt of claim 1.

47. An antistatic agent according to claim 46 wherein the polymeric acid has been neutralized to pH 6–8.

48. An antistatic agent according to claim 35 wherein said polymeric acid is selected from a group consisting of a copolymer of acrylic acid and itaconic acid, a copolymer of acrylic acid and maleic acid, polymethacrylic acid and a copolymer of styrene and maleic acid.

* * * * *